United States Patent
Shinbata et al.

(10) Patent No.: US 7,627,169 B2
(45) Date of Patent: Dec. 1, 2009

(54) IMAGE PROCESSING APPARATUS AND METHOD

(75) Inventors: Hiroyuki Shinbata, Tochigi (JP); Keiji Tsuchiya, Tochigi (JP); Naoto Takahashi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/828,016

(22) Filed: Jul. 25, 2007

(65) Prior Publication Data

US 2008/0019583 A1    Jan. 24, 2008

Related U.S. Application Data

(63) Continuation of application No. 10/705,269, filed on Nov. 10, 2003, now Pat. No. 7,321,686.

(30) Foreign Application Priority Data

Nov. 20, 2002    (JP)    ............... 2002-337127

(51) Int. Cl.
    *G06K 9/00*    (2006.01)
(52) U.S. Cl. .......... 382/168; 382/240; 382/226; 382/254; 382/274; 375/240.18; 375/240.01
(58) Field of Classification Search .......... 382/240, 382/168, 226, 254, 260, 274; 375/240, 240.01, 375/240.18, 240.19; 341/79
    See application file for complete search history.

(56) References Cited

U.S. PATENT DOCUMENTS 4,885,637 A * 12/1989 Shikakura et al. ...... 375/240.12
5,006,931 A * 4/1991 Shirota .................... 375/240.2
5,619,998 A * 4/1997 Abdel-Malek et al. ...... 600/437
5,872,867 A * 2/1999 Bergen ........................ 382/254

(Continued)

FOREIGN PATENT DOCUMENTS

EP    0527 525 A2    2/1993

(Continued)

OTHER PUBLICATIONS

J. Toriwaki; "Digital Image Processing for Image Understanding"; ISBN4-7856-2003-X; vol. 1 and vol. 2; First Edition, Fourth printing; Shokodo; Tokyo, 1988; pp. 133-135.

(Continued)

*Primary Examiner*—Vikkram Bali
*Assistant Examiner*—Ali Bayat
(74) *Attorney, Agent, or Firm*—Canon U.S.A., Inc., IP DIvision

(57) ABSTRACT

Processing for improving the contrast of an image of interest is executed by an image processing circuit in an X-ray photography apparatus. The image is decomposed into coefficient values of a plurality of frequency bands by a frequency-component decomposition circuit to obtain coefficients of each and every frequency band. A coefficient conversion circuit converts coefficient values with regard to at least one frequency band of the plurality of frequency bands in such a manner that a frequency distribution of coefficient values of every frequency band will become a prescribed frequency distribution. A restoration circuit generates an image using the coefficient values obtained by the conversion performed by the coefficient conversion circuit.

3 Claims, 6 Drawing Sheets

U.S. PATENT DOCUMENTS

| | | | |
|---|---|---|---|
| 6,130,724 A | 10/2000 | Hwang | 348/678 |
| 6,163,621 A | 12/2000 | Paik et al. | 382/169 |
| 6,463,173 B1 | 10/2002 | Tretter | 382/168 |
| 7,006,568 B1* | 2/2006 | Gu et al. | 375/240.11 |
| 7,024,046 B2* | 4/2006 | Dekel et al. | 382/240 |
| 7,079,700 B2* | 7/2006 | Shinbata | 382/254 |
| 7,142,722 B2 | 11/2006 | Fukuhara et al. | 382/240 |
| 7,236,637 B2* | 6/2007 | Sirohey et al. | 382/240 |
| 7,302,110 B2* | 11/2007 | Chesnokov | 382/264 |
| 7,321,686 B2* | 1/2008 | Shibata et al. | 382/168 |
| 2002/0169761 A1 | 11/2002 | Endo et al. | 707/3 |
| 2003/0016855 A1 | 1/2003 | Shinbata | 382/132 |
| 2003/0097068 A1 | 5/2003 | Hossack et al. | 600/443 |
| 2007/0274383 A1* | 11/2007 | Yu et al. | 375/240.11 |

FOREIGN PATENT DOCUMENTS

| | | |
|---|---|---|
| JP | 10-191100 | 7/1998 |
| WO | WO 02/45020 | 6/2002 |

OTHER PUBLICATIONS

Andrew F. Laine et al, "Mammographic Feature Enhancement by Multiscale Analysis," IEEE Transaction on Medical Imaging, vol. 13, No. 4, pp. 725-750 (Dec. 1994).

Sang-Yeon Kim et al., "Image Contrast Enhancement Based on The Piecewise- Linear Approximation of CDF," IEEE Transaction on Consumer Electronics, vol. 45, No. 3, pp. 828-834 (Aug. 1999).

Pieter Vuiylsteke et al., "Image Processing in Computed Radiography," DGZFP Proceedings BB 67-CD, p. 16, pp. 87-101 (Mar. 15-17, 1999).

European Patent Office Communication regarding EP Appl. 03256879.2-2218 dated Nov. 17, 2005.

Japanese Office Action for Appl. 2002-337127, dated Jul. 25, 2005.

* cited by examiner

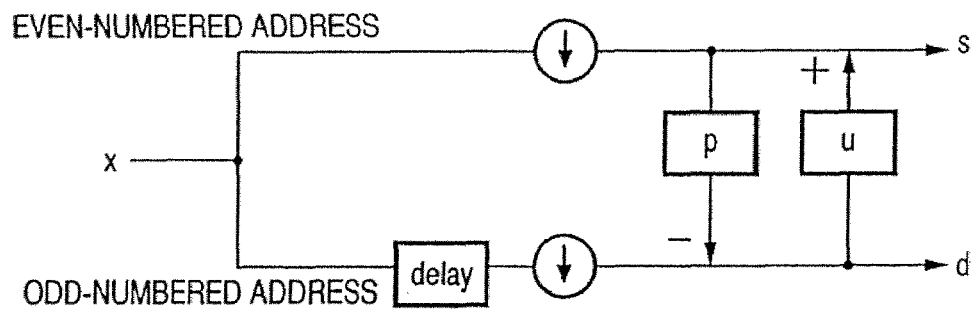
F I G. 6A
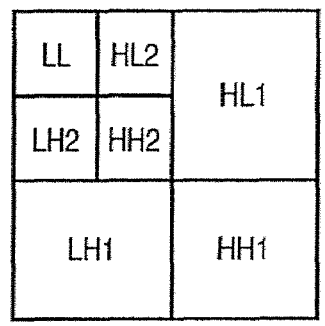
F I G. 6B
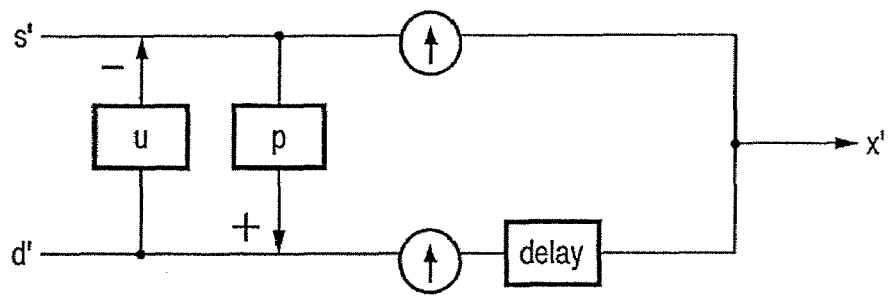
F I G. 6C

IMAGE PROCESSING APPARATUS AND METHOD

This application is a continuation of application Ser. No. 10/705,269, filed Nov. 10, 2003, now U.S. Pat. No. 7,321,686 the entirety of which is incorporated herein by reference.

FIELD OF THE INVENTION

This invention relates to an image processing apparatus and method. More particularly, the invention relates to an image processing apparatus and method for improving the contrast of an image of interest.

BACKGROUND OF THE INVENTION

Owing to recent advances in digital technology, it is now possible to convert a radiation image or the like to a digital image signal and subject the digital image signal to image processing such as frequency processing to output the processed image by displaying it on a display such as a CRT or printing it on film by a printer. In such frequency processing, image processing is executed by decomposing the image of interest into image coefficients of a plurality of frequency bands and increasing or decreasing the image coefficient values of every frequency band individually.

On the other hand, it is common practice to uniformalize a histogram (frequency distribution) of image densities (pixel values) by using a density histogram uniformalizing method [e.g., see "Digital Image Processing [1] for Understanding Images", pp. 133-135, by Junichiro Toriwaki, published by Shokodo, First Edition, Fourth Printing). Using this method makes it possible to utilize a given density range efficiently so that image contrast is improved.

The above method attempts to obtain a desired frequency processing effect by changing the values of frequency coefficients. However, this means nothing more than altering the strength of coefficient values and does not involve the idea of controlling a histogram of coefficient values after a coefficient conversion. More specifically, the conventional method of increasing or decreasing coefficient values involves only increasing or decreasing coefficient values individually on a per-frequency-band basis and does not take into consideration a coefficient histogram of each frequency band. This makes it necessary to adjust coefficients by trial and error in order to obtain the desired effect. Further, when the value of a frequency coefficient is merely changed, this has an effect upon the dynamic range of the image after it has been processed and there are instances where artifacts such as overshoot occur at the edge (contour) of the image.

Further, though image contrast can be improved by uniformalizing a pixel-value histogram, as indicated in the reference cited above, this method implements gray-level conversion processing and not frequency processing, thereby making it impossible to adjust components on a per-frequency-band basis.

The present inventors have discovered that an image of desired contrast is obtained by controlling the frequency distribution of coefficient values of every frequency band in accordance with the particular objective. In the examples of the prior art mentioned above, however, there is no implementation of a coefficient conversion that takes into account a frequency distribution of coefficient values obtained after a coefficient conversion.

In view of the state of the prior art described above, there is need for an image processing apparatus and method whereby the contrast of an image of interest can be improved efficiently and effectively.

SUMMARY OF THE INVENTION

According to one aspect of the present invention, there is provided, an image processing apparatus comprising:
decomposing means for decomposing an image into components of a plurality of frequency bands;
converting means for converting coefficient values with regard to at least one frequency band of the plurality of frequency bands in such a manner that a frequency distribution of coefficient values of every frequency band will become a prescribed frequency distribution; and
generating means for generating an image using the coefficient values obtained by the converting means.

According to another aspect of the present invention, there is provided, an image processing method comprising:
a decomposing step of decomposing an image into components of a plurality of frequency bands;
a converting step of converting coefficient values with regard to at least one frequency band of the plurality of frequency bands in such a manner that a frequency distribution of coefficient values of every frequency band will become a prescribed frequency distribution; and
a generating step of generating an image using the coefficient values obtained by the converting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 6A to 6C are diagrams illustrating a coefficient decomposition circuit and a restoration circuit that employ a discrete wavelet transform.

DETAILED DESCRIPTION OF THE PREFERRED EMBODIMENT

A preferred embodiment of the present invention will now be described in detail in accordance with the accompanying drawings.

Disclosed in this embodiment is an image processing apparatus that executes frequency processing. Specifically, the apparatus converts coefficient values in such a manner that a frequency distribution of coefficient values of every frequency band will take on a desired form.

Figure 1:
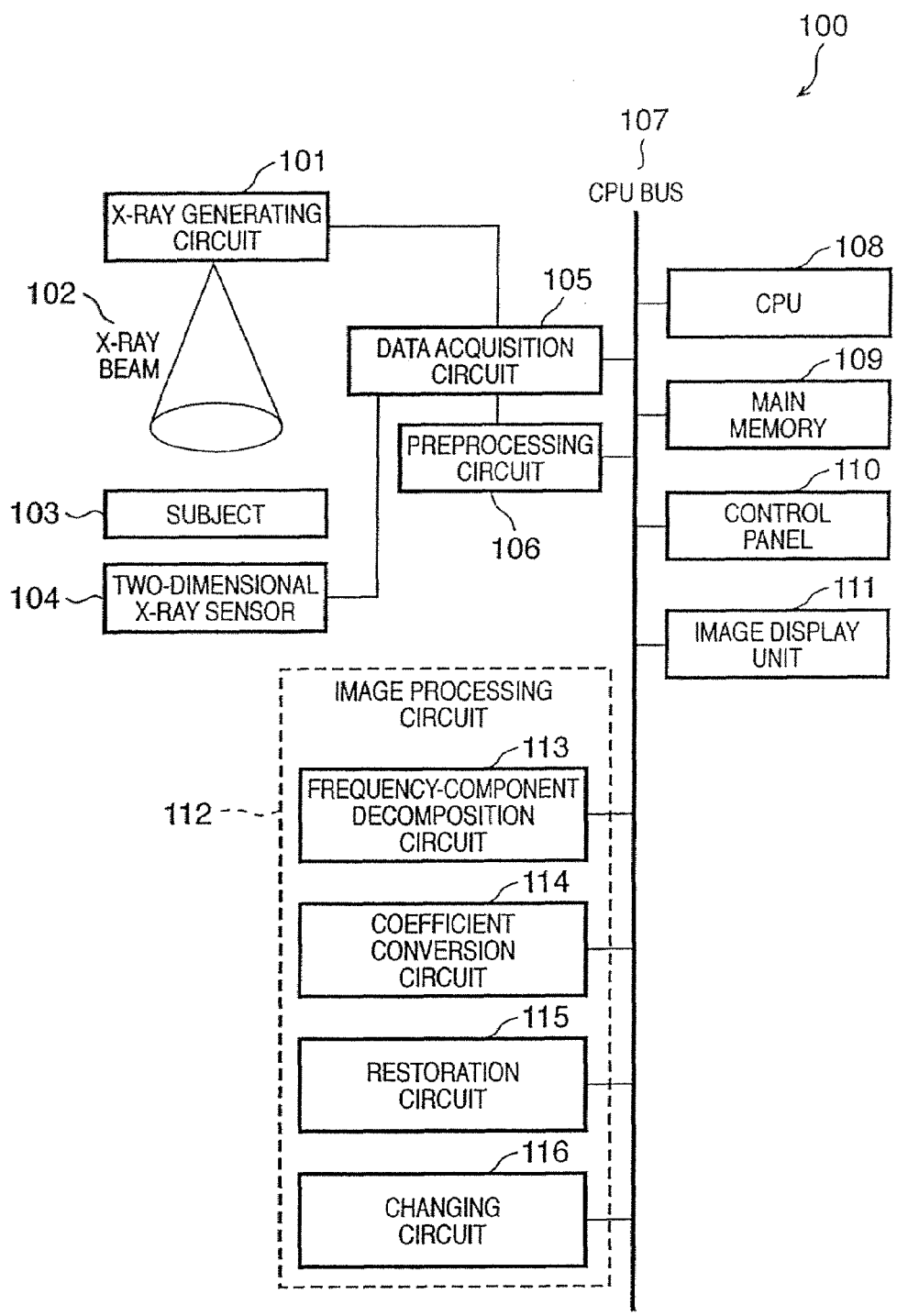
FIG. 1 is a block diagram illustrating the structure of an X-ray photography apparatus according to an embodiment of the present invention.

FIG. 1 is a block diagram illustrating the structure of an X-ray photography apparatus 100 according to a preferred embodiment of the present invention. The X-ray photography apparatus 100 has a function for executing effective image processing when an image that has been captured by photography is output on film or on a monitor. The X-ray photography apparatus 100 includes a data acquisition circuit 105, a preprocessing circuit 106, a CPU 108, a main memory 109, a control panel 110, an image display unit 111 and an image processing circuit 112. These are interconnected by a CPU bus 107 so as to be capable of exchanging data with one another.

The data acquisition circuit 105 and preprocessing circuit 106 in the X-ray photography apparatus 100 are interconnected, and a two-dimensional X-ray sensor 104 and X-ray generating circuit 101 are connected to the data acquisition circuit 105. Furthermore, the image processing circuit 112 is constructed to include a frequency-component decomposition circuit 113, a coefficient conversion circuit 114, a restoration circuit 115 and a changing circuit 116. These circuits are connected to the CPU bus 107.

The functions of the above-mentioned components of the X-ray photography apparatus 100 will become clear from the description that follows.

The main memory 109 in the X-ray photography apparatus 100 set forth above stores a control program and various data necessary for processing by the CPU 108 and also functions as the working memory of the CPU 108. The CPU 108 employs the main memory 109 to control the overall operation of the apparatus in accordance with an operation performed at the control panel 110. As a result, the X-ray photography apparatus 100 operates in the manner set forth below.

First, when the user enters a photography command via the control panel 110, the command is sent to the data acquisition circuit 105 by the CPU 108. Upon receiving the photography command, the data acquisition circuit 105 executes X-ray photography by controlling the X-ray generating circuit 101 and two-dimensional X-ray sensor 104.

In X-ray photography, the X-ray generating circuit 101 emits an X-ray beam 102 toward a specimen 103. The X-ray beam 102 emitted from the X-ray generating circuit 101 passes through the specimen 103 while being attenuated and arrives at the two-dimensional X-ray sensor 104, which responds by outputting an X-ray image signal. In this embodiment, it is assumed that the specimen 103 is a human body. That is, the X-ray image that is output from the two-dimensional X-ray sensor 104 is an image of the human body.

The data acquisition circuit 105 converts the X-ray image signal, which is output from the two-dimensional X-ray sensor 104, to a digital signal and supplies the digital signal to the preprocessing circuit 106 as X-ray image data. The preprocessing circuit 106 subjects the signal (X-ray image data) from the data acquisition circuit 105 to preprocessing such as offset correction processing and gain compensation processing. The X-ray image data that has undergone preprocessing in the preprocessing circuit 106 is transferred as original image data to the main memory 109 and image processing circuit 112 via the CPU bus 107 under the control of the CPU 108.

The frequency-component decomposition circuit 113 in the image processing circuit 112 subjects the original image to a discrete wavelet transform (DWT) and obtains a coefficient (a wavelet transform coefficient) of each frequency band. On the basis of a frequency distribution of the coefficient values of each of the frequency bands obtained by the frequency-component decomposition circuit 113, the coefficient conversion circuit 114 generates a coefficient conversion table that is for the purpose of making this frequency distribution a frequency distribution of a prescribed shape, and uses this coefficient conversion table to convert the frequency coefficients that have been calculated by the frequency-component decomposition circuit 113. Finally, the restoration circuit 115 subjects the coefficients that have been obtained by the coefficient conversion circuit 114 to an inverse discrete wavelet transform (inverse DWT) to obtain an image that has undergone frequency processing. Further, the changing circuit 116 changes the conversion characteristic (conversion table) of the coefficient conversion circuit 114 based upon a command, etc., from the control panel 110. The image that has been obtained by the restoration circuit 115 is stored in an external storage device (not shown) or is displayed on the image display unit 111.

Figure 2:
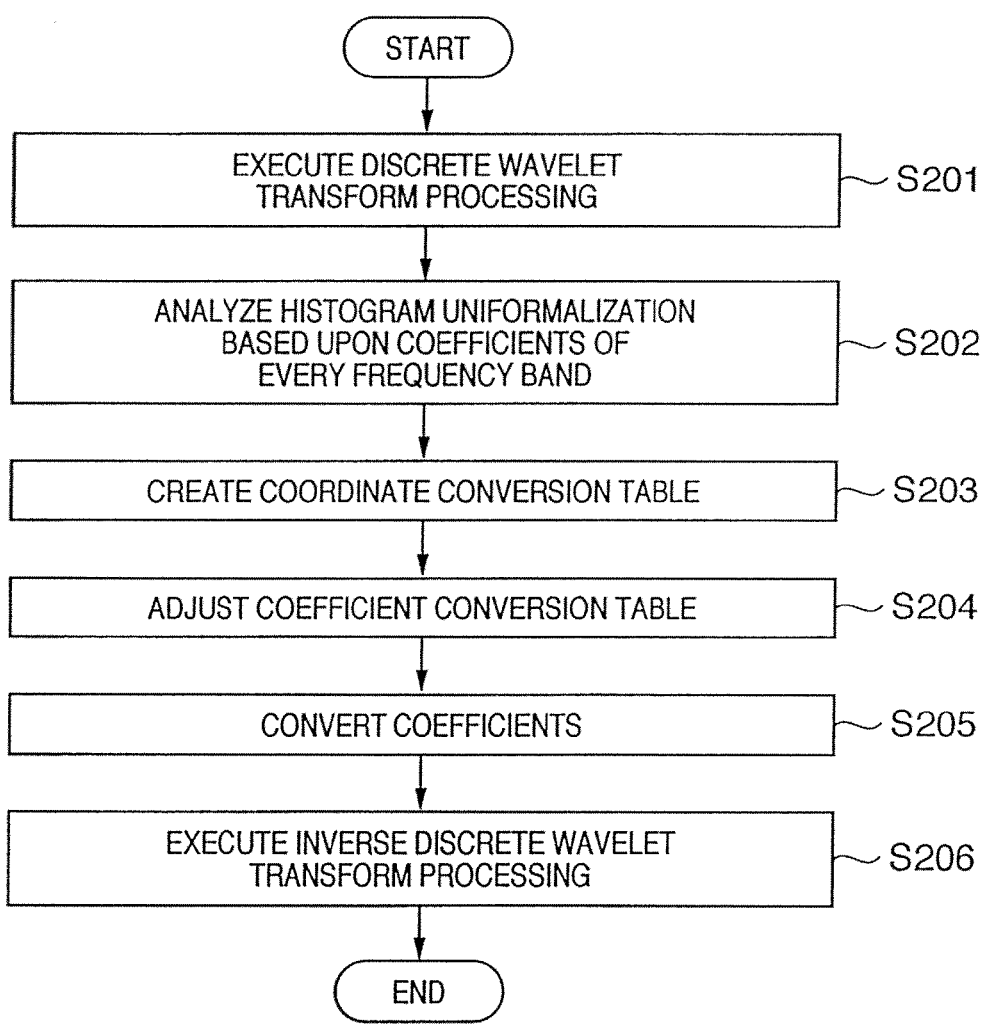
FIG. 2 is a flowchart illustrating the procedure of image processing in the X-ray photography apparatus of this embodiment.

The operation of the X-ray photography apparatus according to this embodiment having the structure set forth above will now be described in greater detail. FIG. 2 is a flowchart illustrating the procedure of image processing in the X-ray photography apparatus 100 of this embodiment.

The original image obtained by the preprocessing circuit 106 is transferred to the image processing circuit 112 via the CPU bus 107 as described above. First, at step S201, the frequency-component decomposition circuit 113 of the image processing circuit 112 subjects the original image, which is represented by f(x,y), to a two-dimensional discrete wavelet transform, calculates coefficients on a per-frequency-band basis and outputs the coefficients.

The discrete wavelet transform will be described with reference to FIGS. 6A and 6B. FIG. 6A is a diagram illustrating the structure of the frequency-component decomposition circuit 113, and FIG. 6B is a diagram illustrating an example of the structure of a two-level transform coefficient group obtained by the two-dimensional DWT processing.

The entered image signal is separated into an even-numbered address signal and an odd-numbered address signal by a combination of a delay element and downsamplers, and the address signals are subjected to filter processing by two filters p and u. In FIG. 6A, reference characters s and d represent low-pass and high-pass coefficients, respectively, which prevail when one level of decomposition is applied to each of the one-dimensional image signals. It is assumed that these coefficients are calculated as follows:

$$d_n = x_{2n+1} - \text{floor}[(x_{2n} + x_{2n+2})/2]$$

$$s_n = x_{2n} + \text{floor}[(d_{n-1} + d_n)/4]$$

where $x_n$ represents the pixel value of an original image that is to undergo conversion, and floor [ ] represents a floor function known in the art.

By virtue of the above processing, a one-dimensional discrete wavelet transform is applied to the image data. A two-dimensional discrete wavelet transform is achieved by executing the above-described one-dimensional transform successively along the horizontal and vertical directions of the image. As the details of this processing are well known, they need not be described here.

FIG. 6B shows an example of the structure of a two-level transform coefficient group obtained by the two-dimensional DWT processing. The image signal is decomposed into coefficient groups HH1, HL1, LH1, . . . , LL of a plurality of different frequency bands. Here HH1, HL1, LH1, . . . , LL are also referred to as subbands and each indicates a coefficient group of every frequency band.

Next, among the subbands obtained at step S201, the subbands of HL, LH, HL indicating high-frequency coefficients are subjected to analysis at step S202 for flattening (uniformalizing) the histogram of coefficient values. A coefficient conversion table is created at step S203 based upon the result of analysis. According to this embodiment, the six subbands HH1, HL1, LH1, HH2, HL2 and LH2 are subjected to a coefficient conversion. However, it will suffice to apply conversion processing to the coefficients of all or some of the subbands (frequency bands) in accordance with the particular objective, as by applying the coefficient conversion only to HH1, HL1 and LH1. For example, if it is desired to improve the contrast of high-frequency components, the coefficients of HH1, LH2 and LH1 are selected. If it is desired to improve the contrast of the next lower range of frequency bands, then the coefficients of HH2, HL2 and LH2 are selected.

Figure 3:
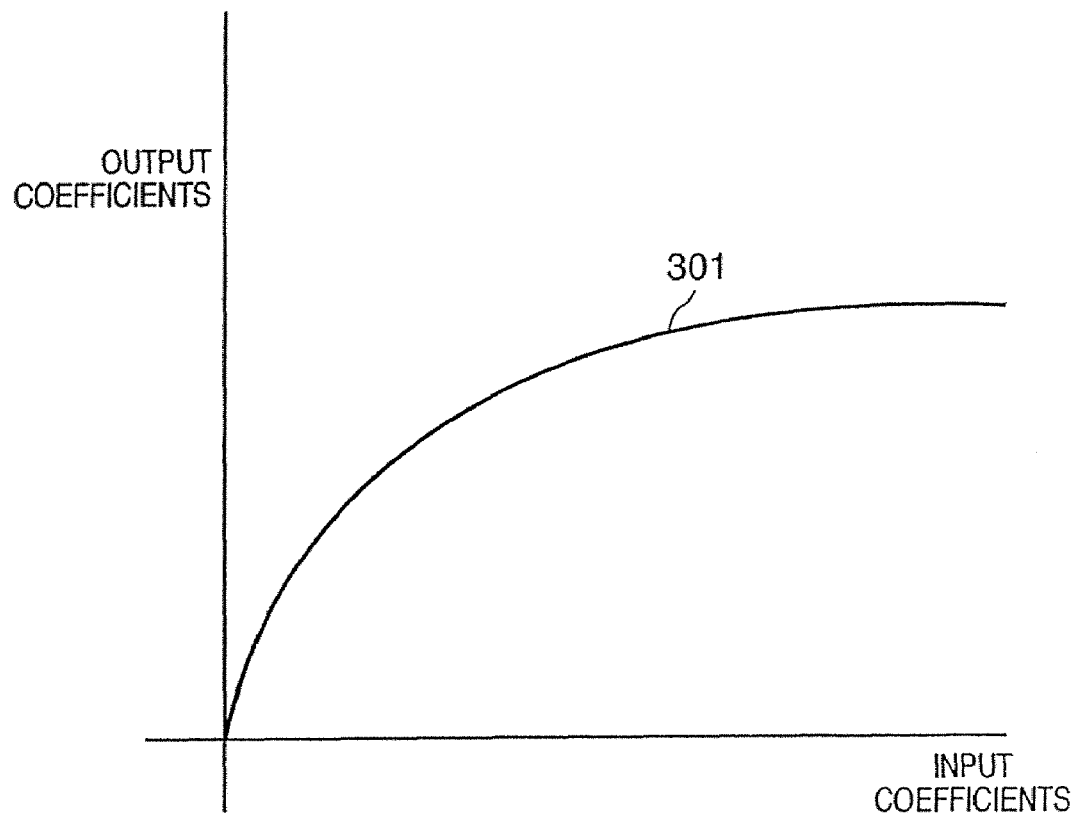
FIG. 3 is a diagram illustrating an example of a coefficient conversion table that uses a histogram uniformalizing method.

By way of example, in a case where a histogram of coefficient values is uniformalized, it will suffice to create a cumulative histogram of coefficient values on a per-subband basis and normalize the shape of the cumulative histogram to obtain a coefficient conversion table (coefficient conversion function). Specifically, it will suffice to create a cumulative histogram (cumulative frequency distribution) by plotting coefficient values along a horizontal axis and the cumulative frequency of the coefficient values along a vertical axis, and obtain a coefficient conversion table by substituting input coefficient values for the horizontal axis of the cumulative histogram and output coefficient values for the vertical axis. An example of a coefficient conversion table thus created is a coefficient conversion table 301 illustrated in FIG. 3. Specifically, FIG. 3 is a diagram illustrating an example of a coefficient conversion table for converting coefficient values, on a per-frequency-band basis, calculated by the frequency-component decomposition circuit 113. The horizontal axis is a plot of input coefficients and the vertical axis a plot of output coefficients. The curve 301 in FIG. 3 corresponds to the coefficient conversion table. The coefficient conversion table 301 is used in the coefficient conversion circuit 114. It should be noted that actual coefficient values take on a positive and negative values. Though the conversion function (conversion table) is originally an odd function, therefore, in FIG. 3 only the first quadrant thereof is illustrated. Further, a cumulative frequency distribution need not be used as is. Rather, the distribution may be smoothened and the coefficient conversion table may be created based upon the smoothened distribution. In such case the smoothing can be implemented as by a method of approximating the cumulative frequency distribution using a polynomial.

The scale along the vertical axis of the conversion table of FIG. 3 can be enlarged or reduced at step S204 to such an extent that coefficient values after conversion will not exceed a maximum value. If this is done, the absolute value of a coefficient value can be adjusted while the flatness of the histogram of coefficient values is maintained. For example, if the scale along the vertical axis is reduced, the values of coefficients after conversion become larger and the frequency of appearance of each coefficient declines. Conversely, if the scale along the vertical axis is enlarged, the values of coefficients after conversion become smaller and the frequency of appearance of each coefficient increases. This makes it possible to adjust the frequency processing effect. Generally, a sharpening effect is obtained if coefficients are increased in value and a smoothing effect is obtained if coefficients are reduced in value.

Figure 4:
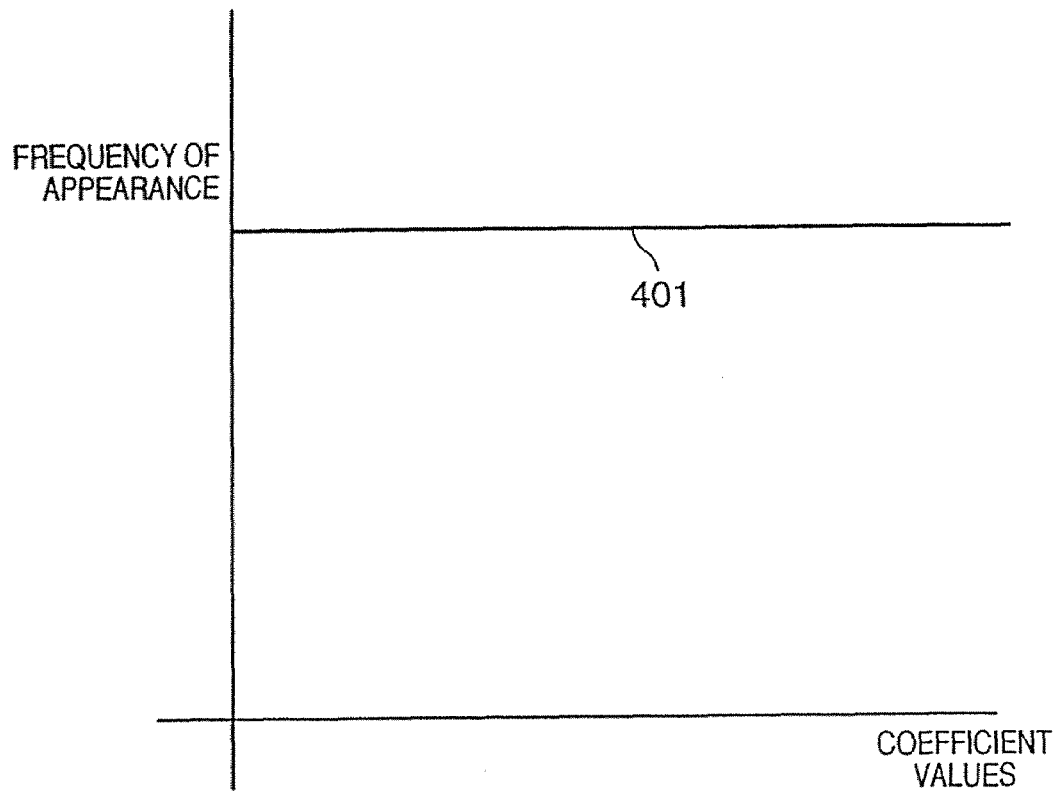
FIG. 4 is a diagram illustrating an ideal example of coefficient values that have undergone a coefficient conversion by a coefficient conversion table that uses a histogram uniformalizing method.

Next, at step S205, the coefficient conversion circuit 114 uses the coefficient conversion table 301, which has been generated as set forth above, to convert the coefficients generated at step S201. When a coefficient value of a subband is converted using the coefficient conversion table 301, the histogram of coefficient values after the conversion ideally takes on the form shown at 401 in FIG. 4. Specifically, FIG. 4 is a diagram illustrating an example of a frequency distribution of coefficient values after conversion in a case where the coefficient conversion has been performed using the coefficient conversion table 301. In FIG. 4, the horizontal axis is a plot of coefficient values and the vertical axis a plot of frequency of appearance of the coefficient values. If the scale along the vertical axis is altered, the height (frequency) and width (range of coefficient values) of the line 401 changes. It should be noted that a change in the coefficient conversion characteristic (conversion table), such as a change in scale, can be performed by the changing circuit 116 based upon a command, etc., from the control panel 110.

Thus, coefficient conversion processing according to this embodiment is such that a coefficient conversion is carried out in such a manner that a frequency distribution of coefficient values after conversion will take on a prescribed shape (e.g., a flat shape). In particular, it has been confirmed that if the frequency distribution of coefficient values is uniformalized as shown in FIG. 4 and restoration processing (described later) is executed, an image of enhanced contrast is obtained. In other words, in accordance with such flattening of a coefficient-value histogram, frequency processing of an image can be executed effectively and efficiently.

An improvement in contrast according to the prior art and an improvement in contrast according to the above embodiment will be described. An improvement in contrast by uniformalization of a density histogram according to the prior art improves the contrast of the overall image; it does not improve the contrast of a specific frequency band. By comparison, the above embodiment is capable of improving the contrast of a specific frequency band. The contrast of a specific frequency band signifies the contrast of an image that has undergone reconstruction processing using only the coefficient of the specific frequency band.

The restoration circuit 115 executes processing for an inverse discrete wavelet transform at step S206 using all of the coefficients after they have been changed by the coefficient conversion circuit 114 in the steps S202 to S205.

FIG. 6C is a diagram illustrating the structure of the restoration circuit 115. Entered coefficients are processed by two filters u and p and the signals are superimposed after upsampling to generate an output image signal x'. The processing involved is represented by the following equations:

$$x'_{2n} = s'_n - \text{floor}[(d'_{n-1} + d'_n)/4]$$

$$x'_{2n+1} = d'_n + \text{floor}[(x'_{2n} + x'_{2n+2})/2]$$

By virtue of the above processing, a one-dimensional inverse discrete wavelet transform is applied to coefficients. A two-dimensional inverse discrete wavelet transform is achieved by executing the above-described one-dimensional inverse transform successively along the horizontal and vertical directions of the image. As the details of this processing are well known, they need not be described here.

In the foregoing, control is exercised so as to flatten the frequency distribution of converted coefficient values of each of the frequency bands, as illustrated in FIG. 4. However, this does not impose a limitation upon the shape of the frequency distribution of converted coefficient values. For example, a shape in which the central portion of the distribution is peak-shaped, a linear shape that is ascending or descending, or a shape that is based upon an ideal coefficient-value frequency distribution of an actual image can be adopted appropriately as the shape of the target frequency distribution. In a case where the frequency distribution is made an ascending straight line, this signifies that a normal frequency of appearance having a large amplitude in the reconstructed image increases in proportion to the wave height. It should be noted that such a frequency-distribution shape can be decided experimentally in accordance with the object of processing or the particular objective.

Figure 5:
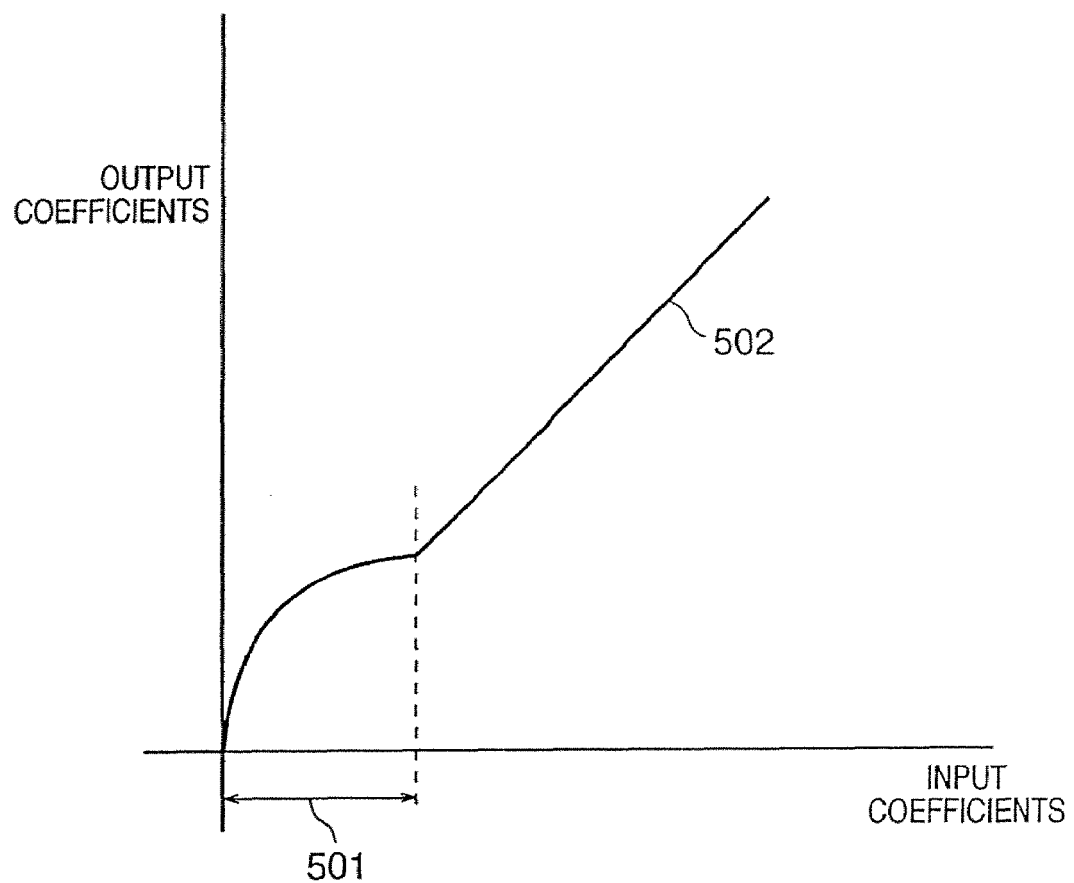
FIG. 5 is a diagram illustrating a conversion table based upon a combination of a coefficient conversion table that uses a histogram uniformalizing method and a coefficient conversion table of linear form.

Furthermore, in a modification of frequency-distribution control, only a coordinate-value histogram within a prescribed local range of coefficient values can be flattened selectively using a conversion table of the kind shown in FIG. 5. Specifically, FIG. 5 is a diagram illustrating an example of a coefficient conversion table in a manner similar to that of FIG. 3. Reference numeral 501 in FIG. 5 denotes a range of coefficient values in which the histogram is to be flattened, and reference numeral 502 represents the coefficient conversion table. The portion corresponding to the range 501 of coefficient values defines a shape in which the histogram is flattened. The portion corresponding to the range of other coefficient values defines a straight line whose slope is 1, so that no conversion of coefficients will take place. Generally, in a high-frequency subband, the coefficient-value range 501 (a range of small coefficient values) indicates a range corresponding to valid information, such as microstructures in a continuous structure (an anatomical structure in the human body), and the range of larger coefficient values indicates a range corresponding to an edge portion such as the contour of a structure. In other words, the coefficient conversion for histogram uniformalization is made to act solely upon the coefficient-value range 501, and the coefficient values in other ranges are not changed. It will suffice if the coefficient-value range 501 is set so as to take on a certain ratio with respect to the overall range of coefficient values (e.g., a ratio of 10% of the overall range).

In a case where the coefficient conversion table shown in FIG. 5 is used, contrast is enhanced in excellent fashion in the image area of the reconstructed image that corresponds to the coefficient-value range 501, and coefficients are held unchanged at an edge portion, which is an image area that corresponds to the other range of coefficient values. An effect obtained, therefore, is that the edge structure is preserved (i.e., false contouring does not occur). That is, effective and efficient frequency processing can be executed while suppressing artifacts such as so-called overshoot. Further, since large coefficient values are held unchanged, a fluctuation in the dynamic range of the reconstructed image is suppressed. Furthermore, in a case where such a coefficient conversion table is used, the contrast enhancing effect of the image area corresponding to the coefficient-value range 501 can be adjusted by altering the scale along the vertical axis, as mentioned above. A further advantage is that the coefficient-value range 501 also is changed in accordance with the image of interest, the subband of interest and the objective of processing.

Thus, in accordance with this embodiment, as described above, a coefficient conversion is performed in such a manner that a frequency distribution of coefficient values after conversion defines a prescribed shape, whereby a desired contrast enhancing effect can be obtained efficiently. For example, in a case where a coefficient conversion is performed using a coefficient conversion table that is in accordance with the histogram flattening method and restoration processing is then executed, an excellent contrast enhancing effect can generally be obtained.

Furthermore, by using a coefficient conversion table so designed that a conversion characteristic based upon the histogram flattening method is adopted with regard to a range of coefficient values for which the absolute value is equal to or less than a predetermined value while the coefficient values are kept unchanged with regard to a range of coefficient values for which the absolute value exceeds the predetermined value, valid portions that correspond to microstructures or the like can be enhanced in contrast effectively and efficiently without producing artifacts such as false contours at edge portions in an image after processing. Furthermore, holding large coefficient values unchanged has the effect of enabling suppression of fluctuation in the dynamic range of the reconstructed image. The reason for this is that there are many cases where a fluctuation in dynamic range is produced by a change in large coefficient values. In addition, by altering the scale along the vertical axis of the coefficient conversion table, coefficient values after conversion are altered at a prescribed ratio uniformly and the contrast enhancing effect can be adjusted.

Furthermore, the decomposition of an image into frequency components is not limited to a discrete wavelet transform. The decomposition can be achieved using other methods, such as by a Laplacian pyramid transform. Moreover, it is permissible to use a method of calculating high- and low-frequency components employing the so-called running-mean method. In such case a high-frequency image is converted using a histogram uniformalizing method [processing equivalent to histogram equalization in image space; see the above-mentioned reference ("Digital Image Processing for Understanding Images")]. The high-frequency components are created by the frequency-component decomposition circuit 113, the high-frequency components are converted using a conversion table that has been created by the coefficient conversion circuit 114 based upon the histogram uniformalizing method, and the high-frequency components that have been converted by the coefficient conversion circuit 114 are added to the low-frequency components by the restoration circuit 115, whereby a processed image is obtained. Thus, though the present embodiment has been described using a discrete wavelet transform, the technical idea of the embodiment is applicable also to a case where use is made of other processing for decomposing an image into frequency components.

It goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    decomposing means for decomposing image data into component values of a plurality of frequency bands;
    converting means for converting the component values in at least one of the plurality of frequency bands; and
    generating means for generating an image based on the component values converted by said converting means,
    wherein said converting means converts the component values so that frequency of appearance of the component values comes close to a predetermined constant value within a range where the component values are lower than a predetermined value, by using an odd function polynomial that approximates the appearance of the component values, and distribution of frequency of appearance of component values is substantially flat.

2. An image processing method comprising:
    using one or more of a processor and a computer to perform:
    a decomposing step for decomposing image data into component values of a plurality of frequency bands;
    a converting step for converting the component values in at least one of the plurality of frequency bands; and
    a generating step for generating an image based on the component values converted by said converting means,
    wherein said converting means converts the component values so that frequency of appearance of the component values comes close to a predetermined constant value within a range where the component values are lower than a predetermined value, by using an odd function polynomial that approximates the appearance of the component values, and distribution of frequency of appearance of component values is substantially flat.

3. A computer program product comprising a computer-readable medium having computer readable program code embodied in said medium for causing a computer to execute the image processing method set forth in claim 2.

* * * * *